J. FRASER.
APPARATUS FOR UNITING PIPE LENGTHS.
APPLICATION FILED FEB. 13, 1909.
999,982.
Patented Aug. 8, 1911.
2 SHEETS—SHEET 1.
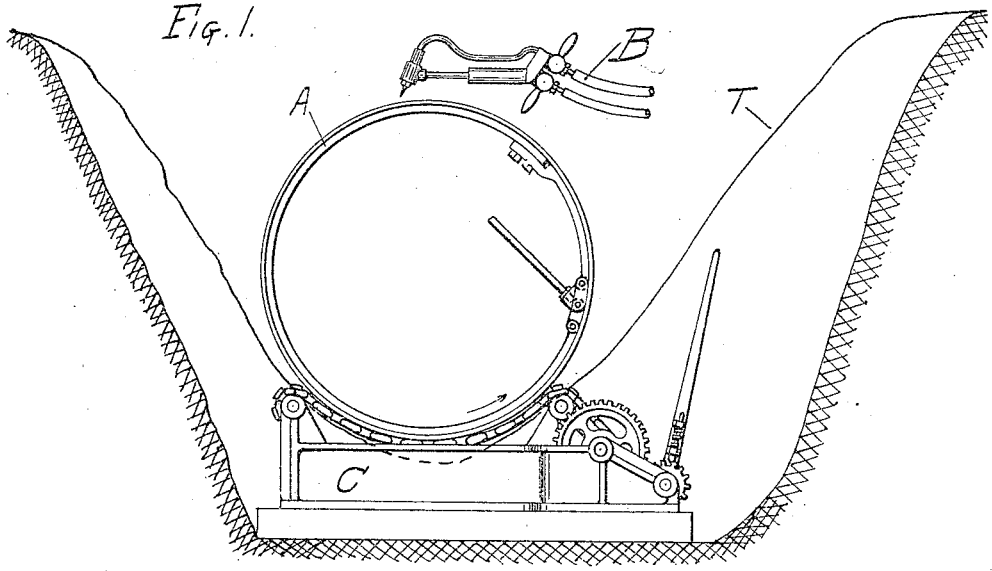
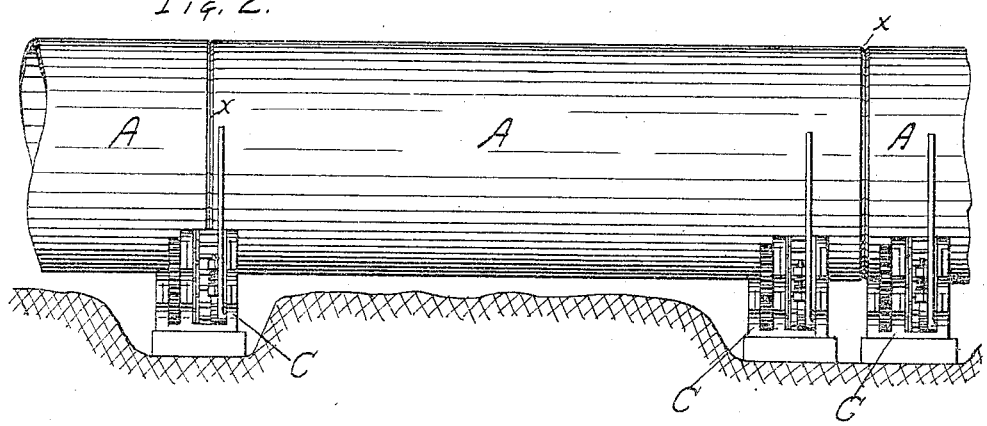
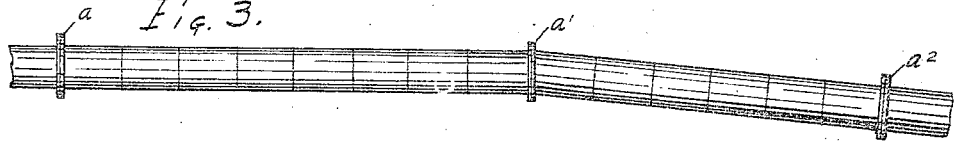
WITNESSES.
L. H. Grote
W. E. Keir
INVENTOR—
John Fraser
by Howson and Howson
attorneys

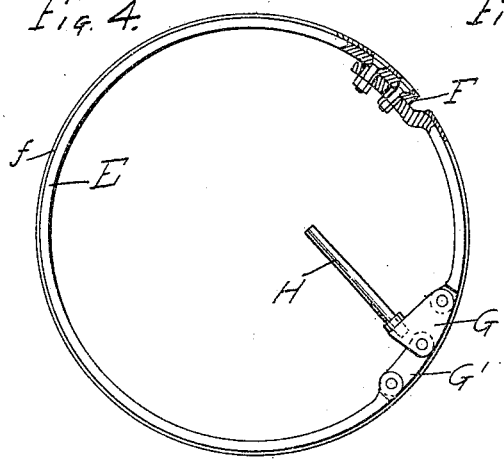
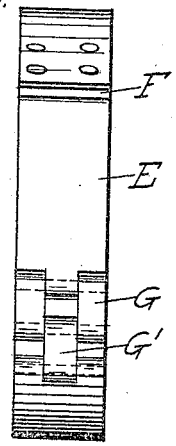
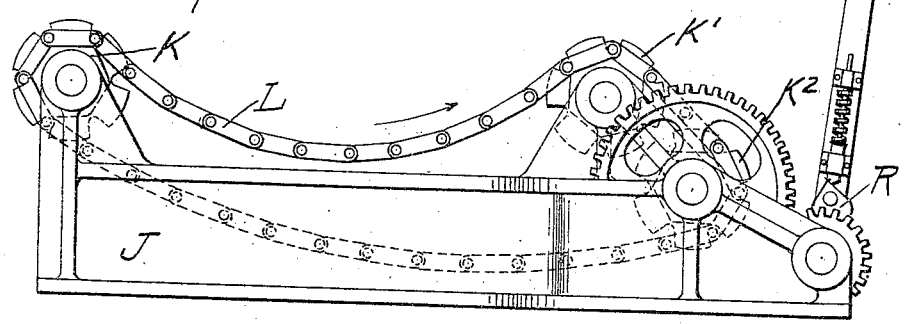
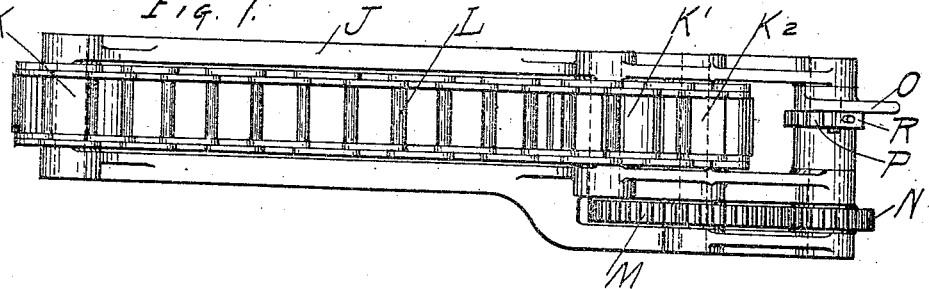

UNITED STATES PATENT OFFICE.

JOHN FRASER, OF HACKENSACK, NEW JERSEY.

APPARATUS FOR UNITING PIPE LENGTHS.

999,982.

Specification of Letters Patent. Patented Aug. 8, 1911.

Application filed February 13, 1909. Serial No. 477,665.

*To all whom it may concern:*

Be it known that I, JOHN FRASER, a citizen of the United States of America, residing in Hackensack, in the county of Bergen, in the State of New Jersey, have invented certain new and useful Improvements in Apparatus for Uniting Pipe Lengths, of which the following is a specification.

My invention relates to the joining together of pipe lengths and is especially useful in uniting pipe sections *in situ* in the laying of pipe lines, particularly when the pipe sections are made of sheet metal.

The object of my invention is to provide an apparatus by which the pipe sections may be united by welding and a pipe line laid more easily, less expensively and more speedily than by known methods and that the finished pipe line shall have a smooth and uniform internal diameter at the welded joints, free from rivets or crevices and of a strength at the welded joints equal to that of the sections of pipe between those joints. This object I attain by the apparatus which I will now describe, and which includes an adjustable and expansible mandrel in the form of a ring to be applied to the interior of the adjacent ends of the pipe sections to aline them for welding, a means for supporting and rotating the pipe sections and a welding apparatus.

In carrying out my invention, I prefer to use the oxy-acetylene welding method, which as is well known, consists in app'ying to the adjacent metal parts to be welded an intensely hot oxy-acetylene gas flame and simultaneously melting off from a stick of a like metal sufficient to fill the joint or space, and this without use of any flux or any hammering or other pressure. I do not, however, limit myself to the use of this type of welding apparatus in all cases.

In the accompanying drawings Figure 1 is a cross-section of a trench and pipe being laid therein by means of my apparatus; Fig. 2 is a longitudinal section through a part of the trench, the pipe lengths and supporting cradles being seen in elevation; Fig. 3 is a diagram, drawn to a smaller scale and showing part of a finished pipe line; Figs. 4 and 5 are side and edge views, respectively, of the mandrel ring; Fig. 6 is a side elevation of my preferred form of supporting and turning cradle; Fig. 7 is a plan view of the same.

Referring to Figs. 1 and 2, A, A, are the sections of sheet metal pipe to be united, their adjacent ends being preferably machined or otherwise beveled to present a circumferential valley or groove $x$ on the outside when they are brought close together. In these figures I have shown the pipe sections as being laid in a trench T, as might be done in laying a water pipe line. To support the pipe sections I provide saddles or cradles C, having means whereby the pipes may be rotated on their axis. These saddles or cradles are arranged at or near the joints. At the left of Fig. 2, I have shown one supporting and rotating cradle at the joint, the cradle being made of a width sufficient to support the two adjacent ends of the pipes which are to be welded together. At the right of Fig. 2, I have shown two such cradles C, one for each pipe end.

In the present instance, I have shown the cradles C as constructed to be placed in the bottom of the trench, which is suitably dug out at the proper points to receive the cradles with their supporting parts at the desired height. As shown in Figs. 6 and 7, the particular embodiment of my cradle invention here illustrated comprises a suitable frame J having at its upper part bearings for wide sprocket wheels K, $K^1$, $K^2$, over which passes a slack chain L. To one of these wheels rotary motion may be imparted by suitable means, such as a lever O with reversible pawl R, acting on ratchet wheel P on the shaft which carries a pinion N, gearing into toothed wheel M on the shaft which carries wheel $K^2$. The pipes will be supported on the wheels K, $K^1$ and chain L, so that by reciprocating the lever O, the pipe sections may be rotated, as for example in the direction of the arrow, Fig. 1.

To effectually and perfectly aline the two adjacent pipe ends, I provide an adjustable and expansible mandrel, consisting of an expanding and collapsible ring E, shown in Figs. 1, 4 and 5. At a suitable point in this ring, I provide a circumferentially adjustable joint F, which may consist of bolts, nuts and slots, as is common for adjustments. Then I connect together the ends of the band, of which the ring is composed, by means of a knee joint or toggle, comprising toggle levers G and $G^1$, with a handle H on one of the toggle levers, so that the ring may be collapsed for insertion into place, and then expanded into place at the joint, the ring being of a width (Fig. 5) sufficient to lap over onto both pipe ends. The adjustable joint at F permits of a limited adjustment for slight variations in pipe diameters, but as a rule different sizes of rings will be provided for different diameters of pipes.

I have indicated the oxy-acetylene welding apparatus at B in Fig. 1. In using this apparatus it is necessary that the parts to be united shall be below the flame, so that the melted metal may fall or flow into place, and therefore the upper half of the pipe joint is welded first, and then the pipes are rotated upon their supports, by the operation of the levers O, so as to bring the unwelded parts uppermost, whereupon the welding can proceed. Because of this necessity for rotating the pipe sections, there is a limit to the number of sections which can be thus welded together. Consequently it will be necessary to unite certain sections in the length of the pipe line, by means of flanges, butt straps or closing-in pieces, as indicated for example at $a$, $a^1$, $a^2$ in the pipe line diagram, Fig. 3, but this is not necessarily a drawback, because such flanged or other joints may be required for other reasons,—because of bends in the line, change of grade, insertion of valves, etc. To prevent any possibility of the ring E becoming welded to the pipe, I prefer to provide the ring with a facing $f$ of asbestos, as seen in Fig. 4, but not shown in Fig. 1 or Fig. 3.

The described construction of supporting and rotating cradle or saddle adapts itself to use for different diameters of pipes. After the welding is done, these cradles or saddles may be easily removed from below the pipes by a little excavating. Less excavating will be required for this apparatus than is required in the common method of uniting pipe sections *in situ* by riveting or the use of packed joints.

I claim as my invention—

1. An apparatus for uniting pipe sections of a pipe line *in situ*, comprising an internal expansible alining mandrel adapted to support the adjacent ends of the sections in alinement, in combination with means adapted to externally support and rotate the pipe sections *in situ*, whereby those adjacent ends may be welded together by the aid of a welding appliance, substantially as described.

2. An apparatus for uniting pipe sections of a pipe line *in situ*, comprising an internal expansible alining mandrel at the adjacent ends of the sections in combination with an external cradle means, provided with slack chains on which the pipe sections may rest and means to operate the chains to rotate the pipe sections, as and for the purpose described.

3. An apparatus for uniting pipe sections of a pipe line *in situ*, comprising an internal expansible alining mandrel at the adjacent ends of the sections, in combination with an external cradle means with a frame adapted to be removably placed in the bottom of the trench and slack chains carried by the frame on which the pipe sections may rest and means to operate the chains to rotate the pipe sections, as and for the purpose described.

4. An apparatus for uniting pipe sections of a pipe line *in situ*, comprising an internal expansible alining mandrel at the adjacent ends of the sections, in combination with an external frame with sprocket wheels, and slack chains passing over the wheels to support the pipe sections externally and means to rotate the sprocket wheels and chains to turn the pipe sections, as and for the purpose described.

In testimony whereof I have signed my name to this specification, in the presence of two subscribing witnesses.

JOHN FRASER.

Witnesses:
WALTER ABBE,
WILLIAM ABBE.